(12) United States Patent
Tiainen

(10) Patent No.: US 7,684,323 B2
(45) Date of Patent: Mar. 23, 2010

(54) SERVICE ERROR HANDLING IN A COMMUNICATIONS NETWORK

(75) Inventor: Vesa Tiainen, Vantaa (FI)

(73) Assignee: Nokia Corporation, Espoo (FI)

( * ) Notice: Subject to any disclaimer, the term of this patent is extended or adjusted under 35 U.S.C. 154(b) by 827 days.

(21) Appl. No.: 11/229,606

(22) Filed: Sep. 20, 2005

(65) Prior Publication Data

US 2007/0005712 A1    Jan. 4, 2007

(30) Foreign Application Priority Data

Jun. 29, 2005    (EP)    ................................. 05014194

(51) Int. Cl.
     *H04J 1/00*      (2006.01)

(52) U.S. Cl. .................. 370/230; 370/235; 370/241; 709/229; 709/228; 709/202

(58) Field of Classification Search .................. 370/230, 370/230.1, 231, 232, 233, 234, 235, 254, 370/389, 397, 409; 709/223, 224, 227–229, 709/200, 202, 203
See application file for complete search history.

(56) References Cited

U.S. PATENT DOCUMENTS

| | | | |
|---|---|---|---|
| 2002/0120729 A1* | 8/2002 | Faccin et al. | ................. 709/223 |
| 2003/0156874 A1 | 8/2003 | Parry | |
| 2005/0177630 A1* | 8/2005 | Jolfaei | ........................ 709/224 |

OTHER PUBLICATIONS

Telecommunications Industry Association—3GPP X.P0013-003-A, "Project No. 3-4935.003-RVI, proposed creation of a new TIA Standard All-IP Core Network Multimedia Domain IP Multimedia (IMS) session handling; IP Multimedia (IM) Call Model: Stage 2", 2005, pp. 1-48.
International Search Report for International Application No. PCT/IB2006/052011, filed Jun. 21, 2006.

* cited by examiner

*Primary Examiner*—Jason E Mattis
*Assistant Examiner*—Dady Chery
(74) *Attorney, Agent, or Firm*—Mintz, Levin, Cohn, Ferris, Glovsky, and Popeo, P.C.

(57) ABSTRACT

Control device behavior in error situations where an error response is received from an application is improved. In case a response message received from an application for a communication request is evaluated as an error message by the control device, control of the communication request can be continued on the basis of service-specific data.

20 Claims, 6 Drawing Sheets

SERVICE ERROR HANDLING IN A COMMUNICATIONS NETWORK

FIELD OF THE INVENTION

The present invention relates to service error handling in a communications network. In particular, the invention relates to processing error responses received by a control entity.

BACKGROUND OF THE INVENTION

FIG. 1 shows a basic architecture of an Internet Protocol (IP) Multimedia Subsystem (IMS).

Devices allowing end users to access network services are called User Equipments (UE). UEs access the IMS network to be able to use services provided by the IMS network. UEs communicate with the IMS network by attaching to a packet switched (PS) network, such as General Packet Radio Service (GPRS) network. The UE may access the IMS network over a radio access network (RAN) or over a fixed line access network, such as Digital Subscriber Line (DSL) access.

The IMS network comprises Session Initiation Protocol (SIP) proxies which process SIP signaling. SIP is an application-layer control protocol for creating, modifying, and terminating sessions with one or more participants. SIP proxies in the IMS network are called Call State Control Functions (CSCF) and the main features of the CSCF are to perform session control functions, service control functions and address translation functions. Depending on the functionality the CSCF provides, it is called Proxy-CSCF (P-CSCF), Interrogating-CSCF (I-CSCF) or Serving-CSCF (S-CSCF).

For a UE the P-CSCF (not shown) is the first contact point in the IMS network. When the UE registers to the IMS network, a P-CSCF is allocated to the UE. The same P-CSCF remains allocated to the UE during the lifetime of the registration, and all signaling between the UE and the IMS network traverses the P-CSCF. The I-CSCF (not shown) is located at the edge of the administrative (operator) domain, in signaling path between the P-CSCF and the S-CSCF. The I-CSCF routes received requests to a correct destination, typically to an S-CSCF. The S-CSCF implements the session control in the IMS network and acts as SIP registrar. All SIP signaling initiated by or destined to a certain UE traverses the S-CSCF assigned to serve the UE.

A Home Subscriber Server (HSS) or User Mobility Server (UMS) stores all the user related subscription data, such as location information, security information and user profile information defining the services that the user is subscribed to. Subscription data is created into the HSS when an end user obtains an IMS subscription from an IMS service provider. The subscription data is associated with an IMS private user identity (IMPI) of the user. The HSS also maintains information about the S-CSCF allocated to the user. During an IMS registration procedure, the I-CSCF may contact the HSS in order to find out the address of the allocated S-CSCF based on the IMS public user identity (IMPU) and IMS private user identity (IMPI) of the user sending the registration request. Once the correct S-CSCF has been reached, the S-CSCF contacts the HSS over Cx interface to download user profile information that includes a service profile for the user.

Application Servers (AS) may be part of the IMS network or alternatively are so-called third party ASs located outside the IMS network. ASs host and execute services using SIP and may have an interface, called Sh interface, to the HSS to retrieve user specific data needed in service execution. The S-CSCF may forward a SIP request to an AS over an IMS Service Control (ISC) interface. The S-CSCF obtains information about ASs from the above mentioned service profile included in the user profile downloaded from the HSS.

For establishing a session between an inviting UE and an invited UE, an S-CSCF forwards SIP requests towards the invited UE, possible after first giving the session control to an AS for executing a service and after the AS has given the session control back to the S-CSCF. Instead of the invited UE, the request could be terminated to an AS, for example to a voice mail server.

FIG. 2 shows a structure of Filter Criteria that is basically a data structure including user specific service information from which an S-CSCF is able determine when an AS is to be contacted for providing a service to the user. User profiles are stored, in the HSS, per Private User Identity (IMPI) and each user profile may comprise several service profiles associated with a Public User Identity (IMPU). Filter Criteria are included in the service profile of the user profile downloaded from the HSS to the S-CSCF during the IMS registration procedure.

Filter Criteria include a priority field. If the service profile comprises more than one Filter Criteria, the S-CSCF assesses Filter Criteria according to the priority of each Filter Criteria (highest priority is taken first). A Trigger Point comprises one or more service trigger points which define the exact conditions of which have to be fulfilled in order to start a service and a certain AS is to be contacted. Examples of service trigger points are the presence of a specific SIP method (INVITE, OPTIONS, SUBSCRIBE, . . . ), partial or full match on the content of any SIP header or SDP line, presence or absence of any SIP header, and content of Request-URI.

Filter criteria further include the address of an AS (SIP URI) to be contacted if a service is to be started based on fulfilled conditions of one of the service point triggers. A Default Handling parameter of Filter Criteria defines the action to be taken if the AS to be contacted is not available, i.e. cannot be reached. The possible actions in this case are abort or continue the processing of the SIP request. Finally, Filter Criteria could include service information, which is transparent service related information that an S-CSCF may forward to an AS when contacting the AS.

As described above, it may happen that an S-CSCF is not able to contact an AS which is defined in the Filter Criteria to provide the service in question. Possible reasons for unavailability of the AS are, for example, some very fatal problem in the AS or an error in ISC interface configuration. The S-CSCF must then proceed according to Default Handling instructions in the Filter Criteria. However, even if the S-CSCF is able to contact the AS, further problems may occur relating to service execution in the AS. For example, the AS is not necessarily able to provide the service based on the information received from S-CSCF or an AS internal error may occur during the service execution. In these cases, the AS responds to the S-CSCF with a SIP response code indicating that an error has occurred and possible more detailed information about the nature or type of the error. The above mentioned Default Handling parameter neither is examined nor used in these cases, since the AS was actually contacted successfully and the problem occurred only later, during the service execution in the AS.

SUMMARY OF THE INVENTION

It is an object of the present invention to improve error handling toward failure responses on a service control interface, e.g. the IMS service control interface (ISC).

This object is achieved by a control device for providing communication control for users in a communications network, the control device comprising:

controlling means for controlling communication requests of the users; and evaluating means for evaluating response messages received from applications, wherein if a response message received from an application for a communication request is evaluated as an error message by the evaluating means, the controlling means is configured to continue control of the communication request based on service-specific data.

Furthermore, the above object is achieved by a method of providing communication control for users in a communications network, the method comprising the steps of:

retrieving service-specific data associated with a user, the service-specific data including communication request handling instructions for response messages received from applications providing services;

initiating a service for the user based on a request received from the user;

receiving, in response to the initiating step, an error response from the service; and determining whether to continue processing the request received from the user based on the instructions given for the error response in the service-specific data.

Moreover, the above object is achieved by a serving device for executing services for users of a communications network, the serving device comprising:

determining means for determining whether a request received from a control device providing communication control for the users in the communications network can be handled by the serving device;

transmitting means for transmitting a response message for the request to the control device, the response message indicating to the control device a determination result by the determining means; and adding means for adding information to the response message transmitted by the transmitting means if the determining means determines that the request cannot be handled by the serving device, wherein the information is to be used by the control device in deciding on communication request control.

Still further the above object is achieved by a data providing device comprising:

at least one database storing user-specific data, the user-specific data comprising service-specific data;

receiving means for receiving a request for retrieving service-specific data associated with a user, from a control device providing communication control for the user in a communications network; and transmitting means for transmitting the service-specific data to the control device upon the request, the service-specific data comprising, for at least one application, instructions for performing communication request control in correspondence with response messages transmitted from the at least one application to the control device.

The above object is also achieved by a control system comprising:

a control device for providing communication control for users in a communications network; and a data providing device, wherein the control device comprises controlling means for controlling communication requests of the users, evaluating means for evaluating response messages received from applications, and retrieving means for issuing a request for retrieving service-specific data associated with a user from the data providing device, and wherein the data providing device comprises at least one database storing user-specific data, the user-specific data comprising service-specific data, receiving means for receiving the request for retrieving the service-specific data associated with the user from the control device, and transmitting means for transmitting the service-specific data to the control device upon the request, wherein if a response message received from an application for a communication request is evaluated as an error message by the evaluating means, the controlling means is configured to continue control of the communication request based on the service-specific data received from the data providing device.

In addition, the above object is achieved by a serving system comprising:

a control device for providing communication control for users in a communications network; and a serving device for executing services for the users, wherein the serving device comprises determining means for determining whether a request received from the control device can be handled by the serving device, and transmitting means for transmitting a response message for the request to the control device, the response message indicating to the control device a determination result by the determining means, and wherein the control device comprises controlling means for controlling communication requests of the users, and evaluating means for evaluating response messages received from the serving device, wherein if the response message received from the serving device for a communication request is evaluated as an error message by the evaluating means, the controlling means is configured to continue control of the communication request on the basis of service-specific data.

The present invention can also be implemented as computer program product.

According to the invention, an S-CSCF behavior in error situations where an error response is received from an AS can be improved.

Moreover, unnecessary AS usage can be avoided, since an AS may be dropped from the connection and session handling may continue without the AS.

DESCRIPTION OF THE INVENTION

Figure 1:
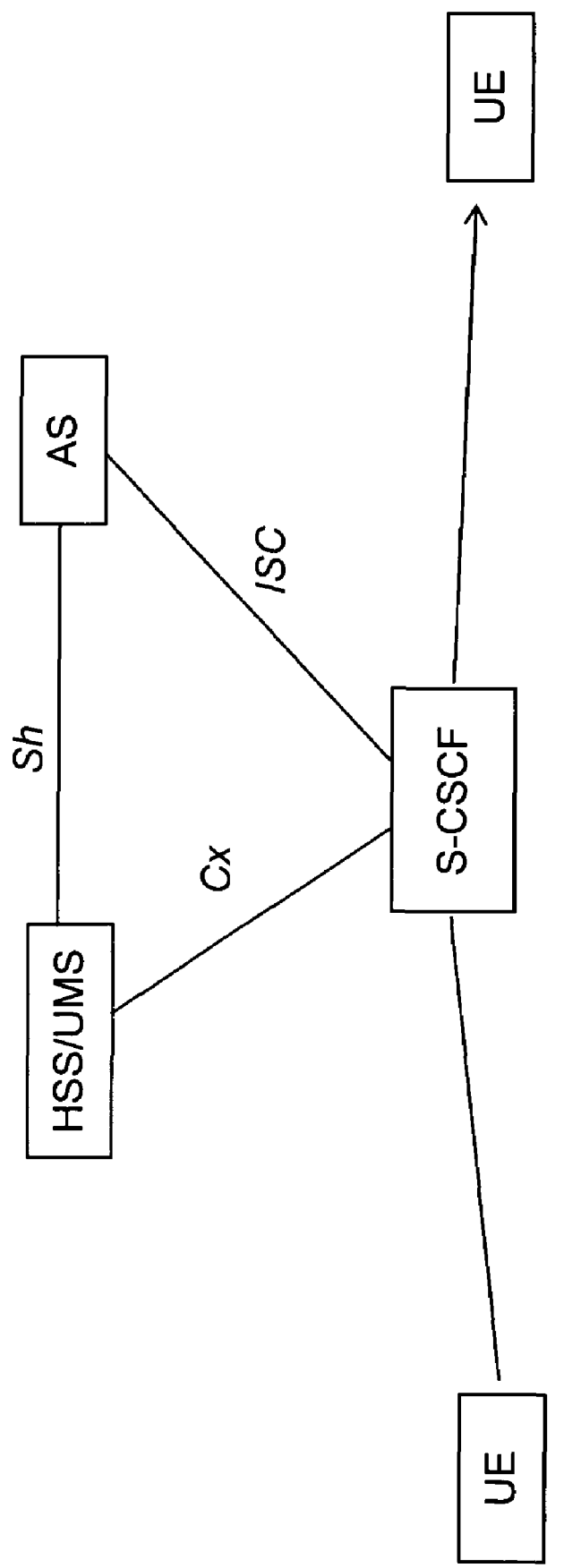
FIG. 1 shows a basic architecture of an Internet Protocol (IP) Multimedia Subsystem (IMS) to which the present invention is applicable.
Figure 2:
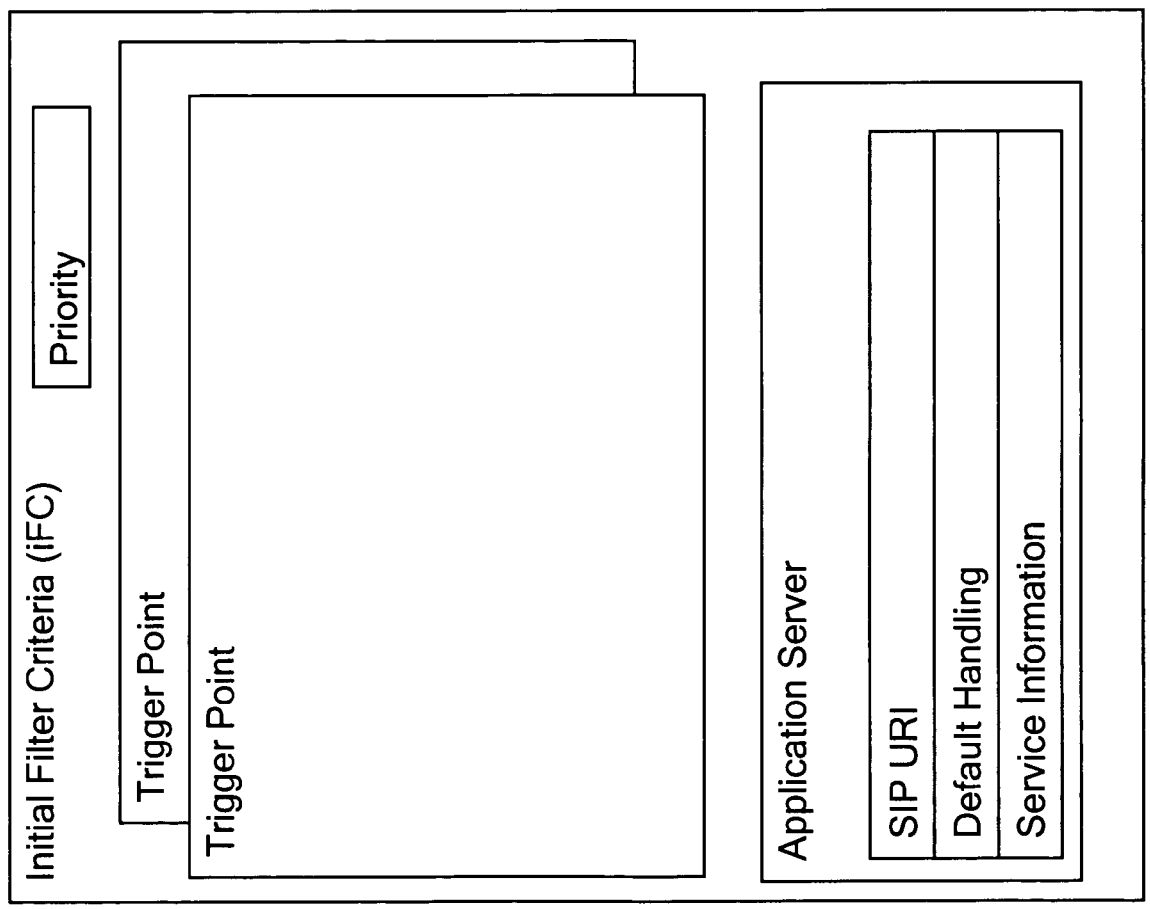
FIG. 2 shows a structure of Filter Criteria according to the prior art.
Figure 3:
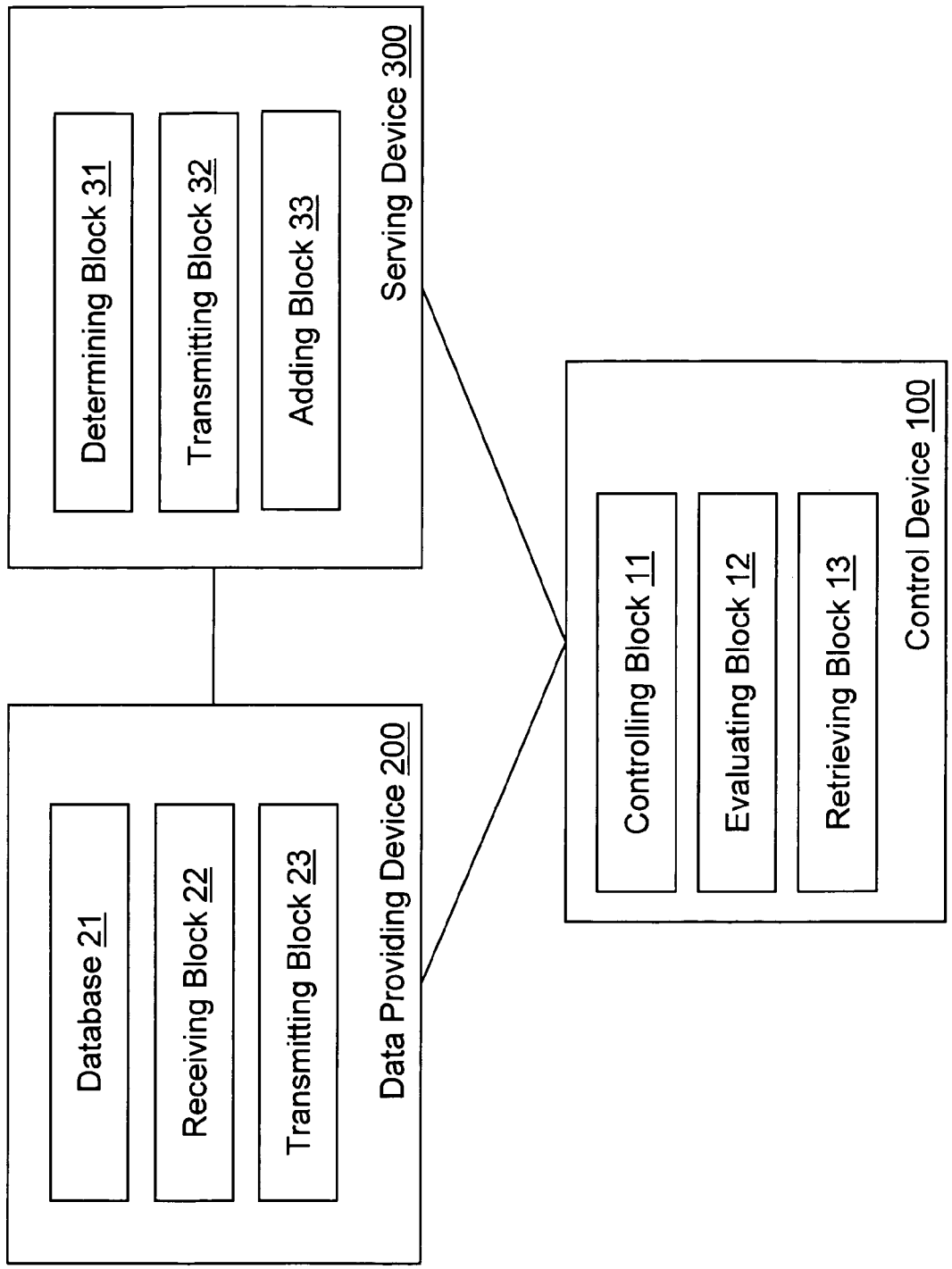
FIG. 3 shows a schematic block diagram illustrating an embodiment of a structure of a control device, a serving device and a data providing device according to the invention.

FIG. 3 shows a schematic block diagram illustrating an embodiment of a structure of a control device 100, a data providing device 200 and a serving device 300 according to the invention.

The control device 100 provides communication control for users in a communications network. The control device 100 may comprise an S-CSCF (Serving Call State Control Function) in an IMS (Internet protocol Multimedia Subsystem) network. The control device comprises a controlling block 11 for controlling/handling communication requests of users and an evaluating block 12 for evaluating response messages received from applications which may run services for users of the communications network. The control device 100 may further comprise a retrieving block 13 for issuing a request for retrieving service-specific data associated with a user from the data providing device 200. A communication request may be a request for establishing a session or a request for sending a message.

The data providing device 200 may comprise a Home Subscriber Server (HSS) or User Mobility Server (UMS) and comprises at least one database 21 storing user-specific data, such as a user profile, comprising service-specific data. The data providing device 200 further comprises a receiving block 22 for receiving the request for retrieving the service-specific data associated with the user from the control device 100, and a transmitting block 23 for transmitting the service-specific data to the control device 100 upon the request.

The serving device 300 executes services for the users of the communications network and may comprise an Application Server (AS) running an application. The serving device comprises a determining block 31 for determining whether a request received from the control device 100 can be handled by the serving device 300, and a transmitting block 32 for transmitting a response message for the request to the control device 100, the response message indicating to the control device 100 a determination result by the determining block 31.

The serving device 300 may further comprise an adding block 33 for adding information to the response message transmitted by the transmitting block 32 in case the determining block 31 determines that the request cannot be handled by the serving device 300, wherein the information is to be used by the control device in deciding on communication request control.

In case the response message received from the serving device 300 for a communication request is evaluated as an error message by the evaluating block 12 of the control device 100, the controlling block 11 continues control of the communication request on the basis of service-specific data. This data may have been retrieved from the data providing device 200 by the retrieving block 13 of the control device 100 or may have been provided to the control device 100 directly from an operator of the control device 100.

The evaluating block 12 of the control device 11 may further evaluate any information added to the response message received from the application or serving device 300, the controlling block 11 deciding on continuing control of the communication request using the information added to the response message.

It is to be noted that the structures of the devices are not limited to those shown in FIG. 3. Blocks of a device may be combined to implement the functionality of the combined blocks in one 'super-block', or the functionality of a block may be further separated into sub-blocks. The blocks of each device may be implemented as application specific integrated circuits or by digital signal processor(s). In addition, the devices shown in FIG. 3 are described to an extent necessary for understanding the present invention, and may additionally comprise conventional blocks and functions necessary for acting e.g. as S-CSCF, HSS and AS.

Figure 4:
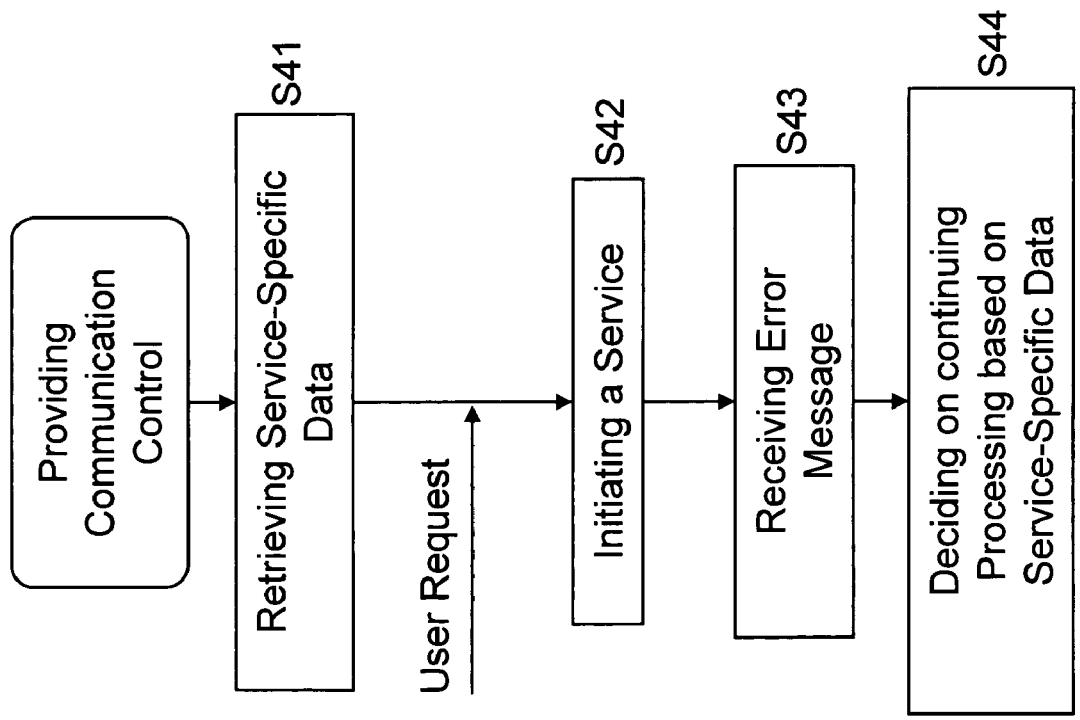
FIG. 4 shows a flow chart illustrating a method of providing communication control for users in a communications network according to an embodiment of the invention.

FIG. 4 shows a flow chart illustrating a method of providing communication control for users in a communications network according to an embodiment of the invention.

In a first step S41 of the method service-specific data associated with a user are retrieved, the service-specific data including communication request handling instructions for response messages received from applications providing services. Upon a request received from the user, in step S42 a service for the user is initiated. Then, when receiving in step S43, in response to the initiating step S42, an error response from the service, in step S44 it is decided on continuing (i.e. it is determined whether to continue) processing the request received from the user based on the instructions given for the error response in the service-specific data.

Figure 5:
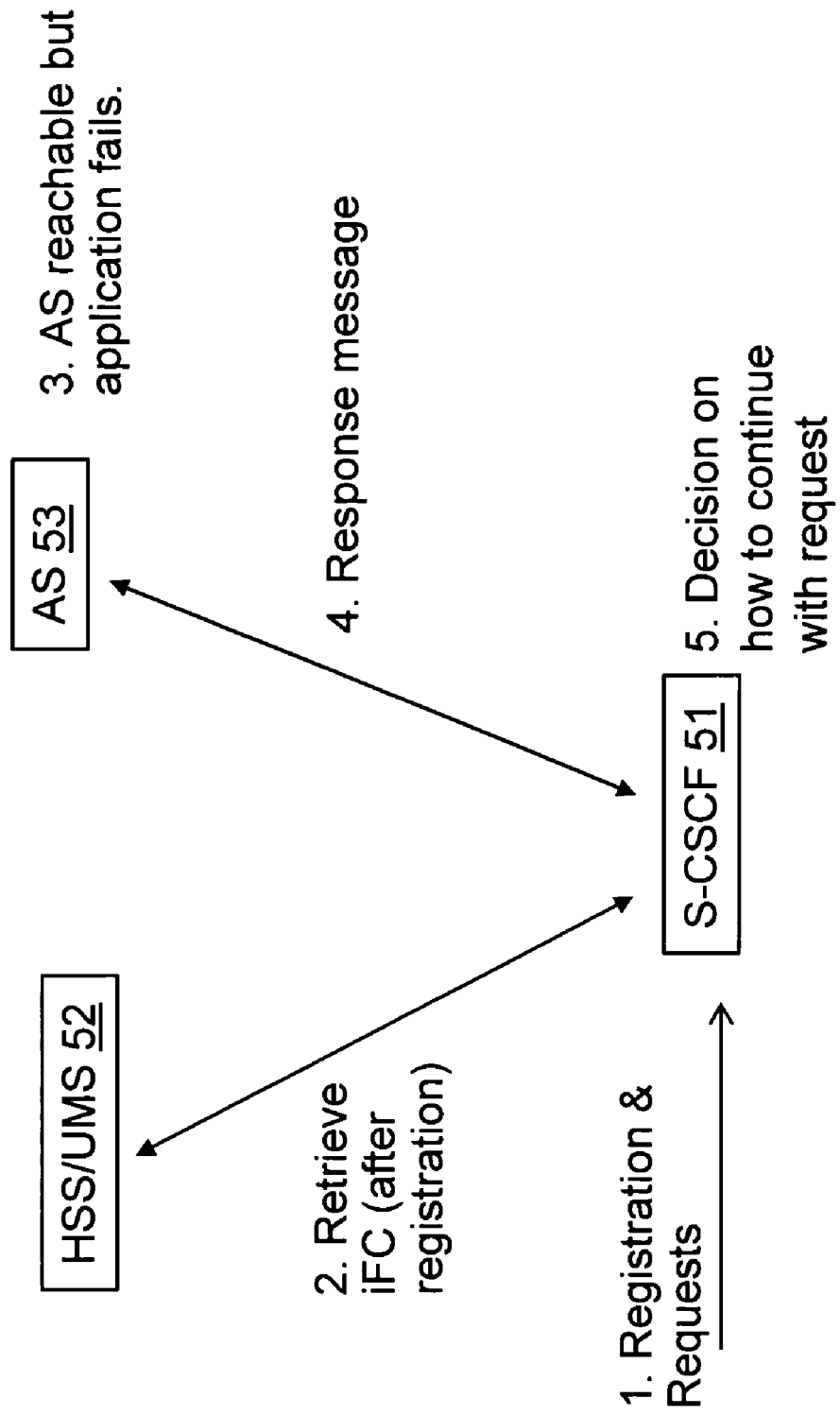
FIG. 5 shows a schematic block diagram illustrating signaling in an IMS network according to an embodiment of the invention.

In the following, signaling in an IMS network to which the embodiment shown in FIG. 4 is applied will be described with reference to FIG. 5. In this application example the functions of the control device 100 are implemented in an S-CSCF (Serving Call State Control Function) 51, the functions of the data providing device 200 are implemented in an HSS (Home Subscriber Server)/UMS (User Mobility Server) 52, and the functions of the serving device 300 are implemented in an AS (Application Server) 53.

Upon registration of a user the S-CSCF 51 fetches initial Filter Criteria (iFC) via Cx interface from the HSS/UMS storing all the user related subscription data, such as location information, security information and user profile information defining the services that the user is subscribed to. The iFC are service-specific data associated with the user. According to this application example, the iFC further include communication request handling instructions for response messages received from applications providing services. The communication request handling instructions comprise response code specific default handling parameters.

Upon receiving a request from the registered user, after having evaluated the iFC, the S-CSCF 51 initiates a service request to the AS 53 via ISC interface. In case the AS 53 is reachable but the application fails, the AS 53 responds with an error message, e.g. with a 4xx, 5xx or 6xx class response.

For example, SIP Responses include a 3-digit Status-Code and a Reason-Phrase. The Status-Code is intended for use by automata, whereas the Reason-Phrase is intended for the end user giving a short textual description of the Status-Code. SIP Responses are categorized into six classes based on the first digit of the Status-Code:

1xx: Provisional response: request received, continuing to process the request;

2xx: Success: the action was successfully received, understood, and accepted;

3xx: Redirection: further action needs to be taken in order to complete the request;

4xx: Client Error: the request contains bad syntax or cannot be fulfilled at this server;

5xx: Server Error: the server failed to fulfill an apparently valid request;

6xx: Global Failure: the request cannot be fulfilled at any server.

The last two digits, referred above as "xx", indicate the more specific reason inside the class. When an AS fails in the service execution it sends one of the 4xx, 5xx or 6xx class responses to the S-CSCF.

When the S-CSCF 51 receives the error message from the AS 53, it decides on how to continue processing the request based on the instructions given for the error message in the iFC. For example, the S-CSCF 51 may further handle the request based on the response code specific default handling parameters, where some response codes can be configured as 'continue', meaning that the S-CSCF 51 should try to further process the request received from the user, and some other response codes can be configured as 'abandon', meaning that the S-CSCF 51 should continue the response handling.

Thus, according to this application example the functionality of the iFC Default Handling parameter usage is expanded, thereby enhancing the ISC interface.

Moreover, the S-CSCF 51 may check and process also additional information added to the error message, e.g. the content of the Reason-Phrase of a SIP response. The S-CSCF 51 may then base the decision on continuing processing the request also on this additional information. Also instructions may be given for the additional information in the iFC.

Thus, with this arrangement, more information about possible errors may be carried from the AS 53 to the S-CSCF 51.

Figure 6:
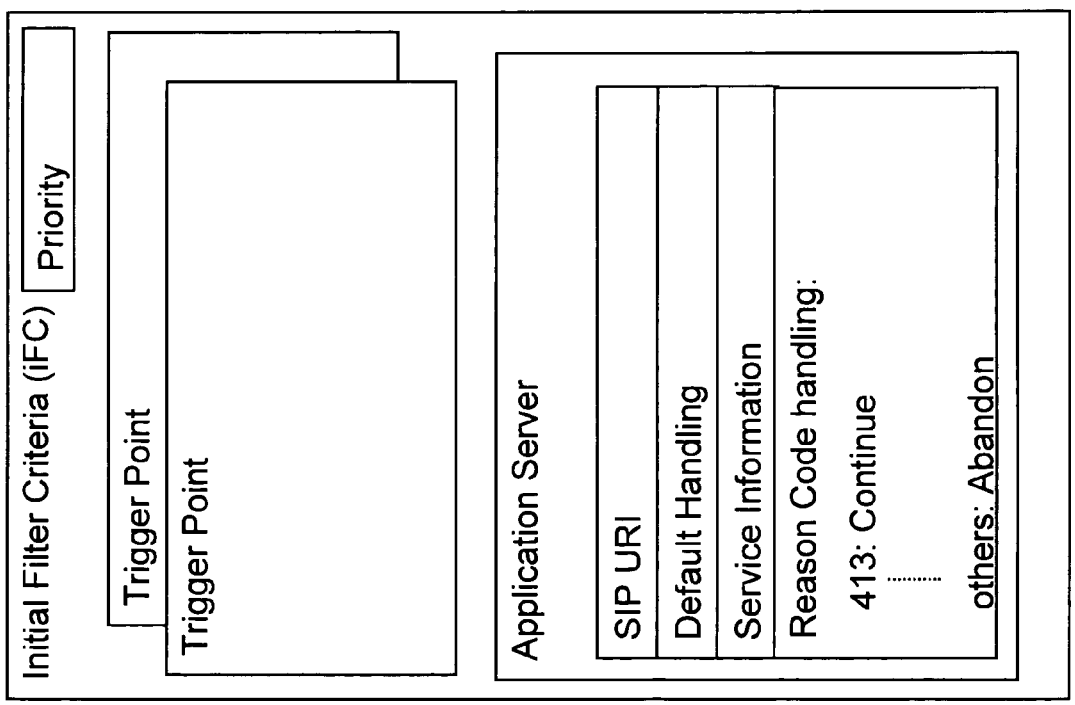
FIG. 6 shows a structure of Filter Criteria according to a first implementation example of the invention.

FIG. 6 shows a structure of Filter Criteria according to a first implementation example of the invention. In the iFC a further field 'Reason code handling' is provided for the default handling of specific responses from an application server running an application providing service(s). For example, the response code specific default handling parameters include an instruction 'continue' for the response code '413', while for other response codes the S-CSCF is instructed to not continue handling the user request, i.e. to abandon processing of the user request, or proceed according to indicated response code.

Figure 7:
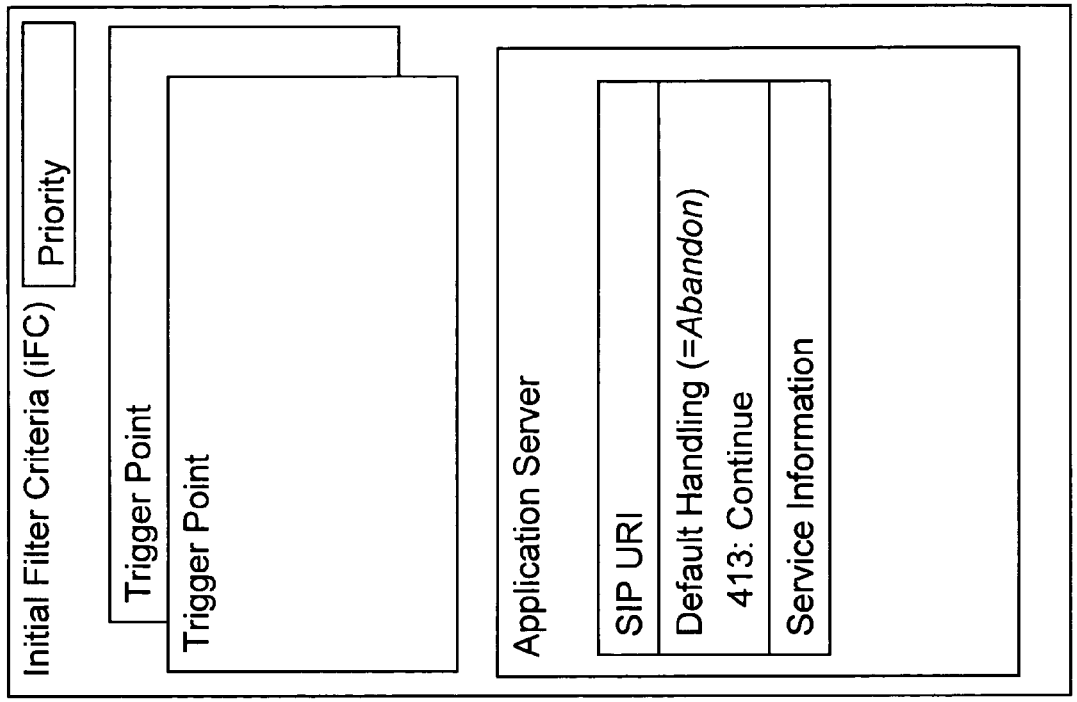
FIG. 7 shows a structure of Filter Criteria according to a second implementation example of the invention.

FIG. 7 shows a structure of Filter Criteria according to a second implementation example of the invention. In this example the reason code handling is added to the 'Default handling' field. As shown in the example depicted in FIG. 7 a general default handling parameter is set to 'abandon', while only when the response code is '413' processing of the user request is to be continued, i.e. the S-CSCF should try to process the request further despite/regardless of the error indicated by the AS 53.

In the following an example is considered in which the S-CSCF 51 receives a request from a registered user causing the S-CSCF 51, based on an evaluation of the iFC retrieved from the HSS/UMS 52, to contact an application server, e.g. the AS 53, for the service of an Instant Message (IM) to GSM Short Message conversion. In case the AS 53 is not able to carry out this conversion e.g. because the instant message is too long, it responds with an error message '413 "Entity too long"'. Upon receiving this error message, the S-CSCF 51 looks up the response code specific default handling parameters in the iFC and, according to FIG. 6, retrieves from the iFC that for a response message '413' processing of the user request is to be continued. Thus, the S-CSCF 51 continues handling the request as verifying the lower priority triggers in the iFC. Thus, the Instant Message handling can be continued without conversion possibility, and the S-CSCF 51 may try to deliver the instant message to the recipient by other means.

As another example, for crucial applications, such as online charging related functions, the response code specific default handling parameters for relevant response codes are preferably set to 'abandon' (i.e. are preferably set to continue response handling) since otherwise the request would be processed further free-of-charge.

According to the invention, control device behavior in error situations where an error response is received from an application is improved. In case a response message received from an application for a communication request is evaluated as an error message by the control device, control of the communication request can be continued on the basis of service-specific data.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
    a controller configured to control communication requests of users and configured to evaluate response messages received from applications,
    wherein when a response message received from an application for a communication request of a user is evaluated as an error message by the controller, the controller is configured to continue control of the communication request based on service-specific data contained in filter criteria included in a service profile of a profile of the user stored in a home subscriber server of the user,
    the service-specific data comprising a reason code handling field which comprises response codes and corresponding processing instructions,
    wherein when the controller evaluates the response message as the error message, the controller is configured to extract a response code from the response message, look up the reason code handling field from the service-specific data using the response code, extract processing instructions corresponding to the response code from the reason code handling field, and use said processing instructions to determine how to proceed with processing the communication request.

2. The apparatus of claim 1, wherein:
    the controller is configured to retrieve the service-specific data from the home subscriber server.

3. The apparatus of claim 2, wherein the controller is configured to evaluate information added to the response message received from the application and is configured to determine whether to continue control of the communication request using the information added to the response message.

4. The apparatus of claim 1, wherein the controller is configured to evaluate information added to the response message received from the application and is configured to determine whether to continue control of the communication request using the information added to the response message.

5. An apparatus, comprising:
    a processor configured to determine whether a request received from a controller configured to provide communication control for users in a communications network can be handled by the apparatus;
    a transmitter configured to transmit a response message for the request to the controller, the response message configured to indicate to the controller a determination result by the processor; and
    an adder configured to add information to the response message transmitted by the transmitter when the processor determines that the request cannot be handled by the apparatus, the information comprising at least a response code, wherein the information is to be used by the controller in deciding on control of a communication request based on service-specific data contained in filter criteria included in a service profile of a profile of the user stored in a home subscriber server of the user, the service-specific data comprising a reason code handling field which comprises response codes and corresponding processing instructions, wherein when the controller evaluates the response message as an error message, the controller is configured to extract the response code from the response message, look up the reason code handling field from the service-specific data using the response code, extract processing instructions corresponding to the response code from the reason code handling field, and use said processing instructions to determine how to proceed with processing the communication request.

6. The apparatus of claim 5, further comprising an application server configured to run an application.

7. An apparatus, comprising:

at least one database configured to store filter criteria in a service profile of a profile of a user, the filter criteria comprising service-specific data;

a receiver configured to receive a request to retrieve the service-specific data associated with the user, from a controller configured to provide communication control for the user in a communications network; and a transmitter configured to transmit the service-specific data to the controller upon the request, the service-specific data comprising, for at least one application, a reason code handling field which comprises response codes and corresponding processing instructions configured to perform control of communication requests in correspondence with response messages transmitted from the at least one application to the controller, wherein when the controller evaluates a response message transmitted from the at least one application as an error message, the controller is configured to extract a response code from the response message, look up the reason code handling field from the service-specific data using the response code, extract processing instructions corresponding to the response code from the reason code handling field, and use said processing instructions to determine how to proceed with processing a communication request of the user.

8. The apparatus of claim 7, further comprising one of a home subscriber server and an user mobility server.

9. A method, comprising:

retrieving service-specific data contained in filter criteria included in a service profile of a profile of a user stored in a home subscriber server of the user, the service-specific data comprising a reason code handling field which comprises response codes and corresponding processing instructions;

initiating a service for the user based on a request received from the user;

receiving, in response to initiating the service, an error response from the service; and extracting a response code from the error response, looking up the reason code handling field from the service-specific data using the response code, extracting processing instructions corresponding to the response code from the reason code handling field, and using said processing instructions to determine how to proceed with processing the request.

10. The method of claim 9, wherein the request received from the user is a request to establish a session or a request to send a message.

11. A computer-readable storage medium encoded with instructions that, when executed by a computer, perform:

retrieving service-specific data contained in filter criteria included in a service profile of a profile of the user stored in a home subscriber server of the user, the service-specific data comprising a reason code handling field which comprises response codes and corresponding processing instructions;

initiating a service for the user based on a request received from the user;

receiving, in response to initiating the service, an error response from the service; and extracting a response code from the error response, looking up the reason code handling field from the service-specific data using the response code, extracting processing instructions corresponding to the response code from the reason code handling field, and using said processing instructions to determine how to proceed with processing the request.

12. The computer-readable storage medium of claim 11, wherein the computer-readable storage medium is an internal memory of the computer.

13. The computer-readable storage medium of claim 11, wherein the request received from the user is a request to establish a session or a request to send a message.

14. A method, comprising:

determining whether a request received from a controller configured to provide communication control for users in a communications network can be handled;

transmitting a response message for the request to the controller, the response message configured to indicate to the controller a determination result; and adding information to the response message when the request cannot be handled, the information comprising at least a response code, wherein the information is to be used by the controller in deciding on control of a communication request based on service-specific data contained in filter criteria included in a service profile of a profile of the user stored in a home subscriber server of the user, the service-specific data comprising a reason code handling field which comprises response codes and corresponding processing instructions, wherein when the controller evaluates the response message as an error message, the controller is configured to extract the response code from the response message, look up the reason code handling field from the service-specific data using the response code, extract processing instructions corresponding to the response code from the reason code handling field, and use said processing instructions to determine how to proceed with processing the communication request.

15. A method, comprising:

storing filter criteria in a service profile of a profile of a user, the filter criteria comprising service-specific data;

receiving a request to retrieve the service-specific data associated with the user, from a controller configured to provide communication control for the user in a communications network; and transmitting the service-specific data to the controller upon the request, the service-specific data comprising, for at least one application, a reason code handling field which comprises response codes and corresponding processing instructions configured to perform control of communication requests in correspondence with response messages transmitted from the at least one application to the controller, wherein when the controller evaluates a response message transmitted from the at least one application as an error message, the controller is configured to extract a response code from the response message, look up the reason code handling field from the service-specific data using the response code, extract processing instructions corresponding to the response code from the reason code handling field, and use said processing instructions to determine how to proceed with processing a communication request of the user.

16. A computer-readable storage medium encoded with instructions that, when executed by a computer, perform:
   determining whether a request received from a controller configured to provide communication control for users in a communications network can be handled;
   transmitting a response message for the request to the controller, the response message configured to indicate to the controller a determination result; and
   adding information to the response message when the request cannot be handled, the information comprising at least a response code, wherein the information is to be used by the controller in deciding on control of a communication request based on service-specific data contained in filter criteria included in a service profile of a profile of the user stored in a home subscriber server of the user,
   the service-specific data comprising a reason code handling field which comprises response codes and corresponding processing instructions,
   wherein when the controller evaluates the response message as an error message, the controller is configured to extract the response code from the response message, look up the reason code handling field from the service-specific data using the response code, extract processing instructions corresponding to the response code from the reason code handling field, and use said processing instructions to determine how to proceed with processing the communication request.

17. A computer-readable storage medium encoded with instructions that, when executed by a computer, perform:
   storing filter criteria in a service profile of a profile of a user, the filter criteria comprising service-specific data;
   receiving a request to retrieve the service-specific data associated with the user, from a controller configured to provide communication control for the user in a communications network; and
   transmitting the service-specific data to the controller upon the request, the service-specific data comprising, for at least one application, a reason code handling field which comprises response codes and corresponding processing instructions configured to perform control of communication requests in correspondence with response messages transmitted from the at least one application to the controller,
   wherein when the controller evaluates a response message transmitted from the at least one application as an error message, the controller is configured to extract a response code from the response message, look up the reason code handling field from the service-specific data using the response code, extract processing instructions corresponding to the response code from the reason code handling field, and use said processing instructions to determine how to proceed with processing a communication request of the user.

18. An apparatus, comprising:
   controlling means for controlling communication requests of users; and
   evaluating means for evaluating response messages received from applications,
   wherein when a response message received from an application for a communication request of a user is evaluated as an error message by the evaluating means, the controlling means is for continuing control of the communication request based on service-specific data contained in filter criteria included in a service profile of a profile of the user stored in a home subscriber server of the user,
   the service-specific data comprising a reason code handling field which comprises response codes and corresponding processing instructions,
   wherein when the evaluating means evaluates the response message as the error message, extracting means of the apparatus is for extracting a response code from the response message, a look up means of the apparatus is for looking up the reason code handling field from the service-specific data using the response code, the extracting means is for extracting processing instructions corresponding to the response code from the reason code handling field, and the controlling means is for using said processing instructions for determining how to proceed with processing the communication request.

19. An apparatus, comprising:
   determining means for determining whether a request received from a control device providing communication control for users in a communications network can be handled by the apparatus;
   transmitting means for transmitting a response message for the request to the control device, the response message indicating to the control device a determination result by the determining means; and
   adding means for adding information to the response message transmitted by the transmitting means when the determining means determines that the request cannot be handled by the apparatus, the information comprising at least a response code, wherein the information is to be used by the control device in deciding on control of communication requests based on service-specific data contained in filter criteria included in a service profile of a profile of the user stored in a home subscriber server of the user,
   the service-specific data comprising a reason code handling field which comprises response codes and corresponding processing instructions,
   wherein when the control device evaluates the response message as an error message, the control device extracts the response code from the response message, looks up the reason code handling field from the service-specific data using the response code, extracts processing instructions corresponding to the response code from the reason code handling field, and uses said processing instructions to determine how to proceed with processing the communication request.

20. An apparatus, comprising:
   at least one database storing filter criteria in a service profile of a profile of a user, the filter criteria comprising service-specific data;
   receiving means for receiving a request for retrieving the service-specific data associated with the user, from a control device providing communication control for the user in a communications network; and
   transmitting means for transmitting the service-specific data to the control device upon the request, the service-specific data comprising, for at least one application, a reason code handling field which comprises response codes and corresponding processing instructions configured to perform control of communication requests in correspondence with response messages transmitted from the at least one application to the control device, wherein when the control device evaluates a response message transmitted from the at least one application as an error message, the control device extracts a response code from the response message, looks up the reason code handling field from the service-specific data using the response code, extracts processing instructions corresponding to the response code from the reason code handling field, and uses said processing instructions to determine how to proceed with processing a communication request of the user.

* * * * *